Dec. 7, 1937.  K. SCHARFENBERG  2,101,721

SPRING

Filed Feb. 4, 1936

Inventor
Karl Scharfenberg
by his attorneys
Howson and Howson

Patented Dec. 7, 1937

2,101,721

UNITED STATES PATENT OFFICE 2,101,721

SPRING

Karl Scharfenberg, Berlin-Nicolassee, Germany

Application February 4, 1936, Serial No. 62,357
In Germany June 3, 1935

9 Claims. (Cl. 267—61)

The present invention is for improvements in or relating to springs, and particularly to composite springs.

One object of the invention is to provide an improved construction of composite spring, whereby the durability and efficiency of the spring is enhanced.

A second object of the invention is to provide an improved construction of composite spring which is such as to facilitate and increase the lubrication of the spring under working conditions.

A third object of the invention is to provide an improved construction of composite spring which is such that the various kinds of springs used therein mutually influence one another.

In carrying the invention into practice, there is provided a composite spring comprising a helical spring surrounded by a radially contractile spring or system of springs. According to a feature of the invention, the composite arrangement of the helical inner spring and the outer radially contractile spring or spring system is such that the two kinds of springs mutually influence one another.

The invention will be clearly understood from the description of preferred embodiments thereof which is given hereinafter, by way of example, with reference to the accompanying drawing, in which.

Figure 1:
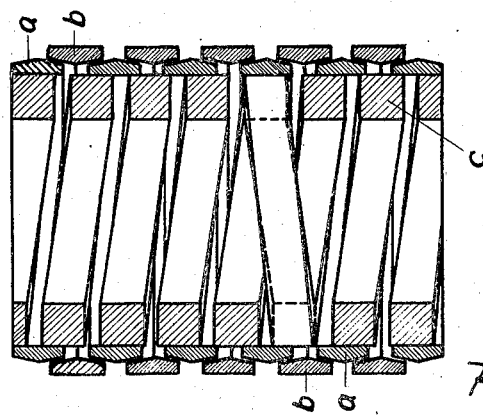
Figure 1 illustrates one embodiment of the invention comprising a helical spring surrounded by two sets of annular contractile springs.

With reference to Figure 1, there is shown therein a composite spring arrangement consisting of an outer spring system of separate closed inner and outer spring rings $a$, $b$, respectively and a helical spring $c$ positioned concentrically within the spring ring system and the spirals of which bear externally with pressure on the inner rings $a$ of the spring ring system.

Figure 2:
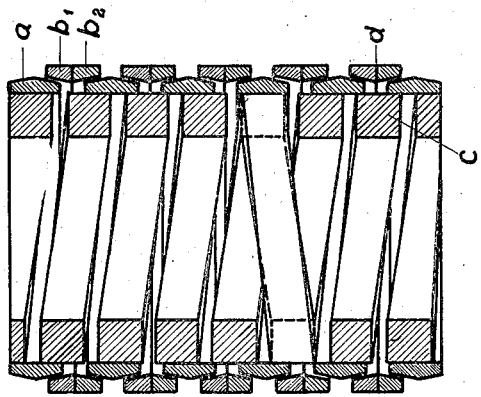
Figure 2 illustrates a modification of the annular contractile spring system according to Figure 1.

In Figure 2 there is shown a modification of the composite spring according to Figure 1, in which each of the outer spring rings $b$ is in two parts, being divided for example in the middle $d$ into the two spring ring halves $b_1$ and $b_2$.

Figure 3:
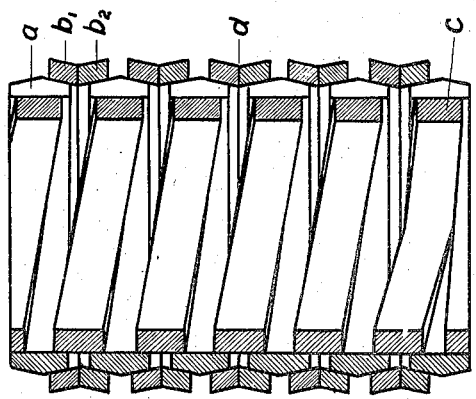
Figure 3 illustrates a further modification of the annular contractile spring system of Figure 2.
Figure 4:
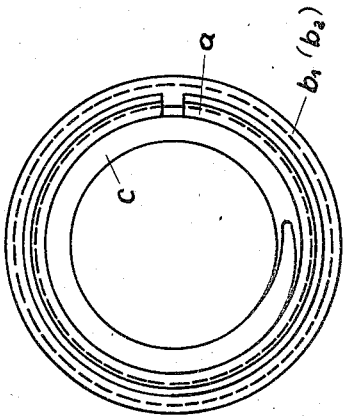
Figure 4 is a plan view of the structure of Fig. 3.

Figure 3 shows a modification of the composite spring according to Figure 2, in which the inner spring rings $a$ are slit, the said inner rings therefore not being closed rings.

The effect of the various embodiments according to Figures 1 to 3 is as follows:

With reference to Figure 1, owing to the helical spring bearing firmly with pressure on the spring ring system, when the composite spring is relieved of load, the spring ring system is expanded. If the composite spring is loaded with the usual lubricating medium, such as grease, the grease is drawn after each movement of the composite spring between the rings of the spring ring system. This is of the utmost importance for the durability and efficient working of the spring ring system. The pressure from the helical spring prevents the rings of the spring ring system assuming an inclined position. Furthermore, the said pressure holds together the rings of the spring ring system when the composite spring is unmounted whereby the mounting thereof is considerably facilitated.

With reference to Figure 2, the effect of dividing the outer rings of the spring ring system is as follows:

On compressing the helical spring, the separate spirals thereof come closer together. Their diameter increases. On compressing the spring ring system, however, a winding of the individual spring rings towards each other does not take place, but the diameter of the inner rings decreases. If now the helical spring bears tightly on the spring ring system, then due to the different action of the helical spring and of the spring ring system, the mutual influencing of the two springs is inappreciable and the necessity arises of making the inner rings of the spring ring system capable of following the movement of rotation of the individual spirals or convolutions of the helical spring and of making the helical spring capable of adaptation to the reduced diameter of the inner rings of the spring ring system. If, however, the outer rings of the spring ring system are divided, as shown in Figure 2, the outer ring halves which act on an inner ring can easily carry out a purely axial movement upon compression of the spring ring system. On the other hand, the outer ring halves which act on two different inner rings can rotate with respect to each other. By the division of the outer rings of the spring ring system therefore, movements of rotation, in consequence of the co-operation with the helical spring, both between the helical spring and the inner rings of the spring ring system, and between the inner and outer rings of the spring ring system are prevented, and these movements of rotation will only be able to take place between the divided outer spring ring halves where they are without influence on the operation of the helical ring spring.

The division of the outer ring of the spring ring system is particularly important when slit inner rings are used as shown in Figure 3, since in consequence of the slitting, the helical spring undergoes a stronger radial compression, which results in an increase in the twisting of the individual spirals or convolutions of the helical spring.

It will be understood, that the invention is in no way limited to the specific embodiments thereof above described and that many modifications of the said embodiments may be made within the scope of the invention as defined by the appended claims.

What I claim and desire to secure by Letters Patent of the United States is:—

1. A composite spring comprising, in combination, a helical spring and an annular radially contractile spring around said helical spring, said helical spring having a plurality of spaced apart axially compressible convolutions engaging said annular radially contractile spring to exert pressure thereon.

2. A composite spring comprising, in combination, a helical spring and a system of annular radially contractile springs surrounding said helical spring, said helical spring having a plurality of spaced apart axially compressible convolutions engaging said radially contractile springs to exert pressure thereon.

3. A composite spring comprising, in combination, a helical spring and a system of annular radially contractile springs surrounding said helical spring, said helical spring having a plurality of spaced apart axially compressible convolutions engaging said radially contractile springs to exert pressure thereon and said annular radially contractile springs forming a seal between the convolutions of said helical spring.

4. A composite spring comprising, in combination, a helical spring, the outer surfaces of the convolutions of which are disposed on a substantially cylindrical surface, and a system of annular radially contractile springs surrounding said helical spring, the inner surfaces of said annular radially contractile springs lying on substantially the same cylindrical surface as the outer surface of the convolutions of the helical spring, said helical spring having a plurality of spaced apart axially compressible convolutions engaging said annular radially contractile springs to exert pressure thereon.

5. A composite spring comprising, in combination, a helical spring, the outer surfaces of the convolutions of which are disposed on a substantially cylindrical surface, and a system of annular radially contractile springs surrounding said helical spring, the inner surfaces of said annular radially contractile springs lying on substantially the same cylindrical surface as the outer surface of the convolutions of the helical spring, said helical spring having a plurality of spaced apart axially compressible convolutions engaging said annular radially contractile springs to exert pressure thereon and said annular radially contractile springs forming a seal between the convolutions of said helical spring.

6. A composite spring comprising, in combination, a spring ring system consisting of individual inner and outer spring rings and a helical spring positioned concentrically within said spring ring system, said helical spring having a plurality of spaced apart axially compressible convolutions engaging the inner rings of said spring ring system to exert pressure thereon.

7. A composite spring comprising, in combination, a spring ring system consisting of individual slit inner spring rings and individual closed outer spring rings, and a helical spring positioned concentrically within said spring ring system, said helical spring having a plurality of spaced apart axially compressible convolutions engaging the inner rings of said spring ring system to exert pressure thereon.

8. A composite spring comprising, in combination, a spring ring system consisting of individual inner spring rings and individual outer spring rings divided substantially in the middle, and a helical spring positioned concentrically within said spring ring system, said helical spring having a plurality of spaced apart axially compressible convolutions engaging the inner rings of said spring ring system to exert pressure thereon.

9. A composite spring comprising, in combination, a spring ring system consisting of individual slit inner spring rings and individual outer spring rings divided in the middle and a helical spring positioned concentrically within said spring ring system, said helical spring having a plurality of spaced apart axially compressible convolutions engaging the inner rings of said spring ring system to exert pressure thereon.

KARL SCHARFENBERG.